(12) United States Patent
Herzberg et al.

(10) Patent No.: US 9,644,343 B2
(45) Date of Patent: May 9, 2017

(54) CONSTRUCTION MACHINE WITH MACHINE COMPONENT

(71) Applicant: JOSEPH VOEGELE AG, Ludwigshafen/Rhein (DE)

(72) Inventors: Ingo Herzberg, Angelbachtal (DE); Thomas Schmidt, Plankstadt (DE); Martin Buschmann, Neustadt (DE)

(73) Assignee: JOSEPH VOEGELE AG (DE)

(*) Notice: Subject to any disclaimer, the term of this patent is extended or adjusted under 35 U.S.C. 154(b) by 603 days.

(21) Appl. No.: 14/067,478

(22) Filed: Oct. 30, 2013

(65) Prior Publication Data

US 2014/0120822 A1 May 1, 2014

(30) Foreign Application Priority Data

Oct. 30, 2012 (EP) .................. 12 007 422

(51) Int. Cl.
*B60H 1/24* (2006.01)
*E02F 9/08* (2006.01)
*F01P 5/06* (2006.01)
*E01C 19/48* (2006.01)
*F01P 11/10* (2006.01)

(52) U.S. Cl.
CPC ............ *E02F 9/0866* (2013.01); *F01P 5/06* (2013.01); *B60Y 2200/414* (2013.01); *B60Y 2306/05* (2013.01); *E01C 19/48* (2013.01); *F01P 11/10* (2013.01)

(58) Field of Classification Search
CPC ......... E02F 9/0866; E02F 9/0858; F01P 5/06; F01P 11/10; E01C 19/48; B60Y 2200/414; B60Y 2306/05

USPC .......................................... 454/141
See application file for complete search history.

(56) References Cited

U.S. PATENT DOCUMENTS 5,692,467 A * 12/1997 Sahm .................. B60K 11/02
123/198 E
5,816,351 A * 10/1998 Akira .................. B60K 11/08
180/68.1
(Continued)

FOREIGN PATENT DOCUMENTS

CN 201520209 U 7/2010
DE 102005057308 A1 6/2007
(Continued)

OTHER PUBLICATIONS

Chinese Office Action Dated Jul. 31, 2015, Application No. 201310528749.9, Applicant Joseph Voegele AG, 3 Pages.
(Continued)

*Primary Examiner* — Gregory Huson
*Assistant Examiner* — Dana Tighe
(74) *Attorney, Agent, or Firm* — Brooks Kushman P.C.

(57) ABSTRACT

A construction machine according to the disclosure comprises a primary drive configured to generate waste heat and one or a plurality of machine components, the machine components being arranged in the area of the primary drive of the construction machine. At least one of the machine components is arranged in a housing including at least one flow passage through which ambient air is sucked using underpressure or which can have ambient air supplied thereto using overpressure so that an air current is created.

20 Claims, 5 Drawing Sheets

(56) References Cited

U.S. PATENT DOCUMENTS

| | | | |
|---|---|---|---|
| 7,388,301 B2* | 6/2008 | Komiyama | E02F 9/0866 180/312 |
| 7,997,966 B2* | 8/2011 | Yoda | B60K 1/04 361/695 |
| 8,616,322 B2 | 12/2013 | Shimomura et al. | |
| 2001/0045761 A1 | 11/2001 | Ozawa et al. | |
| 2003/0127137 A1 | 7/2003 | Van Wie | |
| 2003/0218849 A1 | 11/2003 | Mochizuki et al. | |
| 2008/0051974 A1 | 2/2008 | Hayashi | |
| 2010/0294577 A1* | 11/2010 | Shimomura | B60K 1/04 180/65.1 |
| 2011/0219762 A1* | 9/2011 | Kobayashi | B60K 11/08 60/456 |
| 2011/0236131 A1* | 9/2011 | Heindtel | E01C 19/48 404/83 |
| 2012/0049664 A1* | 3/2012 | Yokoyama | B60H 1/00392 310/53 |
| 2012/0182689 A1* | 7/2012 | Donth | H05K 7/20909 361/695 |

FOREIGN PATENT DOCUMENTS

| | | |
|---|---|---|
| DE | 102008022887 A1 | 11/2009 |
| EP | 1775392 A2 | 4/2007 |
| EP | 2053167 A1 | 4/2009 |
| EP | 2256258 A2 | 12/2010 |
| EP | 2357150 A1 | 8/2011 |
| EP | 2397611 A1 | 12/2011 |
| JP | 07061245 A | 3/1995 |
| JP | 08063261 A | 3/1996 |
| JP | H09207691 A | 8/1997 |
| JP | 2000096609 A | 4/2000 |
| JP | 2000192816 A | 7/2000 |
| JP | 2000257429 A | 9/2000 |
| JP | 2001203476 A | 7/2001 |
| JP | 2003013469 A | 1/2003 |
| JP | 2003110266 A | 4/2003 |
| JP | 2003267064 A | 9/2003 |
| JP | 2003309238 A | 10/2003 |
| JP | 2004225429 A | 8/2004 |
| JP | 2004239211 A | 8/2004 |
| JP | 2004351967 A | 12/2004 |
| JP | 2005351286 A | 12/2005 |
| JP | 2007063876 A | 3/2007 |
| JP | 2007230464 A | 9/2007 |
| JP | 2009030164 A | 2/2009 |
| JP | 2010116122 A | 5/2010 |
| JP | 2010174480 A | 8/2010 |
| JP | 2010234845 | 10/2010 |
| JP | 2010270554 A | 12/2010 |
| JP | 2012051386 A | 3/2012 |
| WO | 2008026386 A1 | 3/2008 |
| WO | 2012062384 A2 | 5/2012 |
| WO | 2012135821 A2 | 10/2012 |

OTHER PUBLICATIONS

Japanese Office Action Dated Jul. 16, 2015, Application No. 2013-200067, 5 Pages.

Extended European Search Report Dated Jan. 7, 2015, Application No. 12 007 422.4-1606, Applicant Joseph Voegele AG, 7 Pages.

Japanese Office Action Dated Dec. 9, 2014, Application No. 2013-200067, Dispatch No. 636331, 3 Pages.

European Search Report Dated Mar. 8, 2013, Applicant Joseph Voegele AG, Application No. 12007422.4-1606, 7 Pages.

Chinese Office Action Application No. 201310528749.9 Dated Jul. 31, 2015, English Machine Translation.

Japanese Office Action Application No. 2013-200067 Dated Jul. 16, 2015, English Machine Translation.

CN201520209U, Abstract & Machine Translation.

JPH09207691A, Abstract & Machine Translation.

JP2001203476A, Abstract & Machine Translation.

JP2003110266A, Abstract & Machine Translation.

JP2005351286A, US 2008/0051974 A1.

JP2007230464A, Abstract & Machine Translation.

JP2010270554A, U.S. Pat. No. 8,616,322 B2.

Japanese Office Action Dated Feb. 21, 2017, Application No. 2016-085697, Applicant Ogawa, Moriaki, 5 pages.

* cited by examiner

CONSTRUCTION MACHINE WITH MACHINE COMPONENT

CROSS-REFERENCE TO RELATED APPLICATIONS

This application claims foreign priority benefits under 35 U.S.C. §119(a)-(d) to European patent application number EP 12 007 422.4, filed Oct. 30, 2012, which is incorporated by reference in its entirety.

TECHNICAL FIELD

The disclosure relates to a construction machine with a drive and a machine component.

BACKGROUND

Arranging components of a construction machine in housings is known in practice. They are provided for protecting the respective component accommodated therein against environmental influences. Conventional housings protect their contents primarily against ingress of dust, dirt, water and other liquids or objects which may damage the content mechanically. EP 2 397 611 A1, JP 2007-063876 A, JP 2004-225429 A, JP 2004-351967 A, JP 2000-096609 A and JP 2003-013469 A are here cited exemplarily. All these references disclose housings for electric or electronic components for construction machines. US 2003/127137 A1 represents another example. This reference discloses a housing for hydraulic components of a snowplow.

In particular in the case of electronic and electric components, the housings are frequently arranged in the area of the operator's cab so that they can easily be accessed by the driver or operator. In some construction machines, e.g., in road finishers, the operator's cab is located close to the primary drive of the construction machine so that it may happen that the housing and the machine component accommodated therein are exposed to the waste heat of the primary drive. This may entail problems, especially in the case of heat sensitive machine components and high ambient temperatures on a construction site.

SUMMARY

Considering that construction machines are increasingly used in comparatively hot regions of the world and must withstand the environmental conditions prevailing there, it is therefore an object of the present invention to ensure trouble-free operation of the construction machine even at high ambient temperatures.

A construction machine according to the present disclosure is characterized in that at least one of the machine components arranged in the area of the primary drive is accommodated in a housing including at least one flow passage through which ambient air can be sucked using underpressure or which can have ambient air supplied thereto using overpressure so that an air current is created. In this way, heat is dissipated from the interior of the housing and the content of the housing is protected against overheating. An arrangement in the area of the primary drive within the meaning of the present disclosure is given when the machine component is positioned directly adjacent to the primary drive or located in an area in which it is influenced by the waste heat of the primary drive. The at least one machine component may be electric or electronic components, hydraulic components, tanks or arbitrary other components. Furthermore, the housing may be tightly closed or it may include units allowing easy opening on the part of the operator, such as one or a plurality of lids, flaps, doors or the like. The primary drive may e.g., be an internal combustion engine.

It may be of advantage when the pressure difference creating the air current is generated by a fan. The fan may be arranged directly in or at the flow passage or it may be arranged in a duct provided for supplying air to or for discharging it from the housing. The duct may e.g., be a tube or a hose.

It may be particularly advantageous when the pressure difference creating the air current is generated by a cooling device of the primary drive. In this way, an additional fan may possibly be dispensed with.

According to a preferred variant, the air current is variably adjustable, e.g., with respect to its flow rate. It can thus be adapted to the prevailing conditions according to requirements. This can be done manually through user inputs or automatically, e.g., on the basis of parameters measured by sensors.

It may be of advantage when the air current can be controlled depending on the temperature of the respective machine component accommodated in the housing or depending on the temperature of the primary drive. The temperature of the respective machine component as well as the temperature of the primary drive may here also be used simultaneously in a closed loop control process. This will facilitate the work of the operating staff and also ensure at any time that the temperature of the machine component does not increase to undesirable values.

In addition, it is conceivable that cooling fins extend from a wall of the flow passage into the flow passage. Heat transport from the component into the flow passage could thus be further improved. In addition, the air current flowing through the flow passage can thus be deflected in a targeted way, if necessary.

It may also be expedient when a heat exchanger, which conducts heat from the internal space of the housing, is arranged in the flow passage. In this way, components requiring particularly intensive cooling could also be protected against overheating. In addition, a heat pump may be provided, if necessary.

According to a further advantageous variant, the flow passage is shaped such that when air flows therethrough a turbulent or a laminar air current will be created. This can have a positive influence on heat transport as well or on other factors, e.g., noise development or the air pressure that builds up in the space in question.

It may be particularly advantageous when an air inlet and an air outlet are arranged on opposite sides of the flow passage and/or of the housing, respectively. This ensures that the air current flows across the largest possible area of the inner wall of the flow passage, whereby improved heat exchange is accomplished. An equivalent result can also be achieved by a juxtaposed arrangement of the air inlet and the air outlet by extending the path along which the air current flows between air inlet and air outlet using a long flow passage.

It is conceivable that the flow passage is configured as a double wall. This is particularly advantageous when those wall elements of the housing that face the primary drive are configured as a double wall. In this way, the waste heat of the primary drive does not even arrive at the internal space of the housing. Additional protection against overheating is thus obtained for the components in the housing.

It may also be expedient when the thermal conductivity of an inner wall of the housing is higher than the thermal conductivity of an outer wall. This improves heat transport from the internal space of the housing into the flow passage defined by the double wall, while the transport of heat from outside into the same flow passage is reduced. In this way it is ensured that the highest possible percentage of the heat dissipated by the air current is removed from the machine component accommodated in the housing. This can be accomplished by various measures. For example, different materials with different thermal conductivities may be provided for the inner wall and the outer wall. Furthermore, different wall thicknesses, various kinds of heat insulation, multilayered walls and the like are conceivable.

In addition, it may be of advantage when only the wall elements facing the primary drive are configured as double-walled elements. If the space available is restricted, installation space can be saved in this way.

According to a further advantageous variant, all the wall elements of the housing may be configured as double-walled elements. The machine component accommodated in the housing is thus protected against thermal loads from all sides.

It may be particularly advantageous when the housing is thermally decoupled at its fastening units e.g., from a machine frame or an engine case. Thermal bridges counteracting the cooling effect can be eliminated in this way.

The construction machine is preferably a road finisher or a feeder.

In the following, an advantageous embodiment of the disclosure will be explained in more detail with reference to the attached drawings.

DETAILED DESCRIPTION

Figure 1:
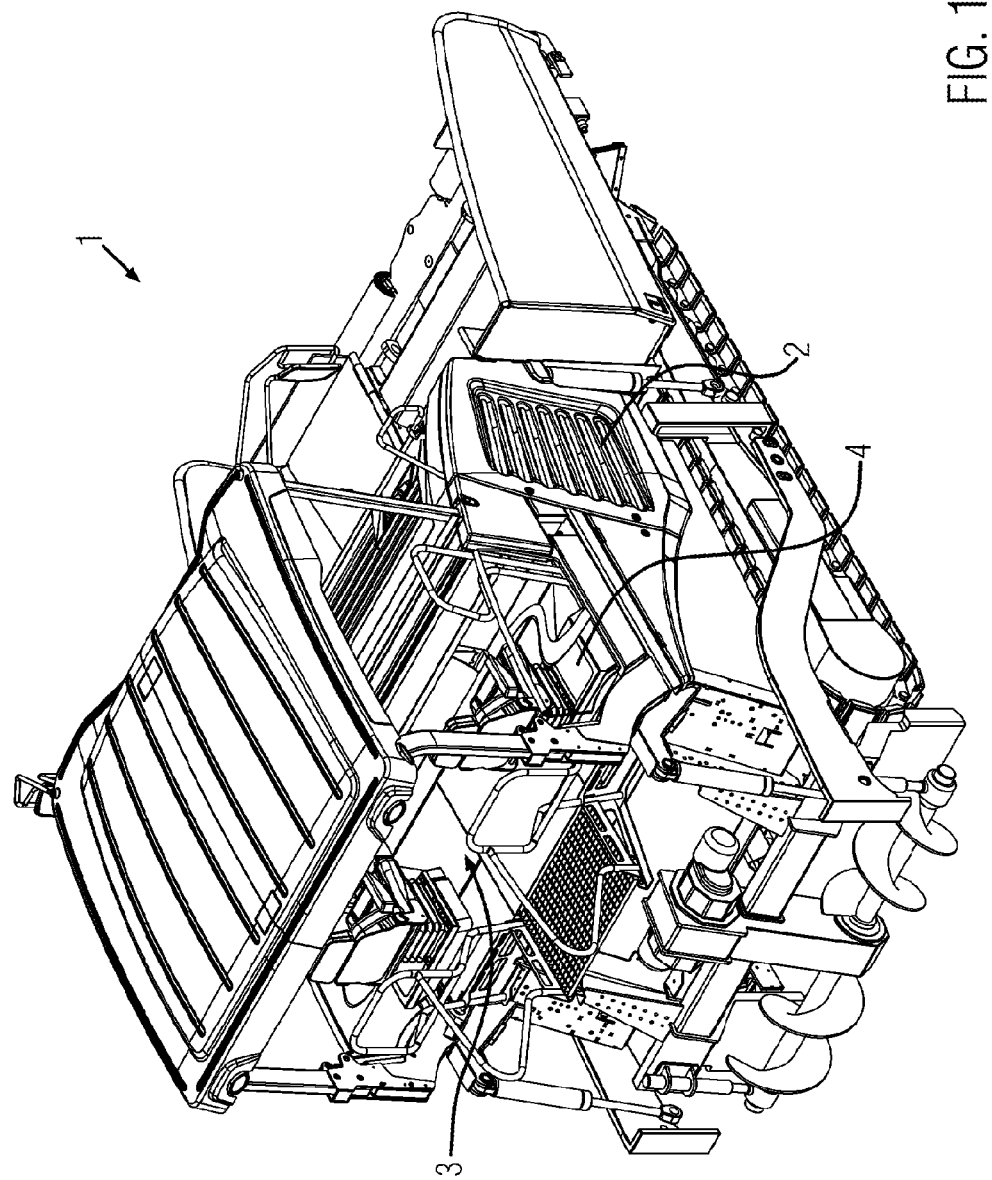
FIG. 1 shows a perspective view of a construction machine, which is a road finisher in the case of this example. The disclosure may, however, also be some other construction machine.

FIG. 1 shows a construction machine 1, in this case a road finisher, including a primary drive 2 positioned here behind a body part provided with cooling slots. Above the primary drive 2, an operator's cab 3 is arranged, the bottom of this operator's cab 3 having embedded therein a machine component 4. This place of installation is representative of all the places of installation of machine components which are located in the area of the primary drive, i.e., which are exposed to waste heat of the primary drive.

Figure 2:
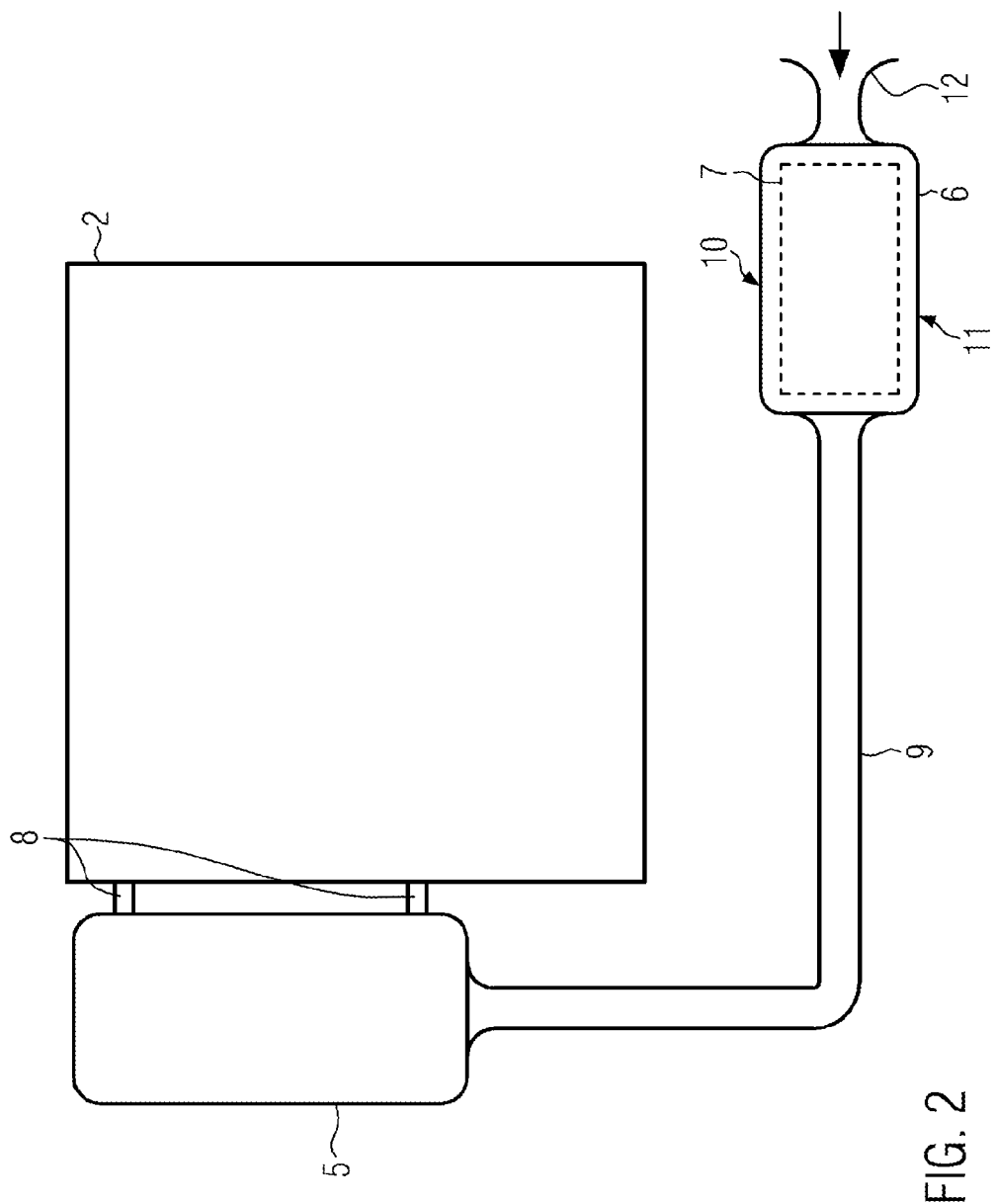
FIG. 2 shows in a schematic view the primary drive of the construction machine shown in FIG. 1, a cooling device of the primary drive as well as a housing for accommodating a machine component.

FIG. 2 schematically shows how the primary drive 2 of the construction machine 1, a cooling device 5 of the primary drive 2 as well as a housing 6 for accommodating a machine component 7 are arranged relative to one another. The machine component 7 may be one or a plurality of electric or electronic components, hydraulic components, a tank or arbitrary other components. In the present embodiment, the cooling device 5 is arranged directly adjacent to the primary drive 2. It may, however, also be arranged further away from the primary drive 2 and connected thereto through cooling ducts 8. The housing 6 and the machine component 7 accommodated therein are arranged in the area of the primary drive 2, which is frequently implemented as an internal combustion engine. This means that they are located either directly adjacent to the primary drive 2 or in an area in which they are influenced by the waste heat of the primary drive 2. The cooling device 5 and the housing 6 are interconnected by a hose 9. Alternatively to a hose, a tube or some arbitrary other duct element may also be used.

The housing 6 is composed of various wall elements. Wall element 10 is located on the housing side facing the primary drive 2 and wall element 11 is located on the housing side facing away from the primary drive 2. The housing 6 has provided thereon an air inlet 12 through which air can be sucked in either directly or through additional duct elements (not shown). The pressure difference required therefor is generated by the cooling device 5 in the embodiment shown. A fan or an arbitrary other unit may, however, be used for this purpose as well.

Figure 3:
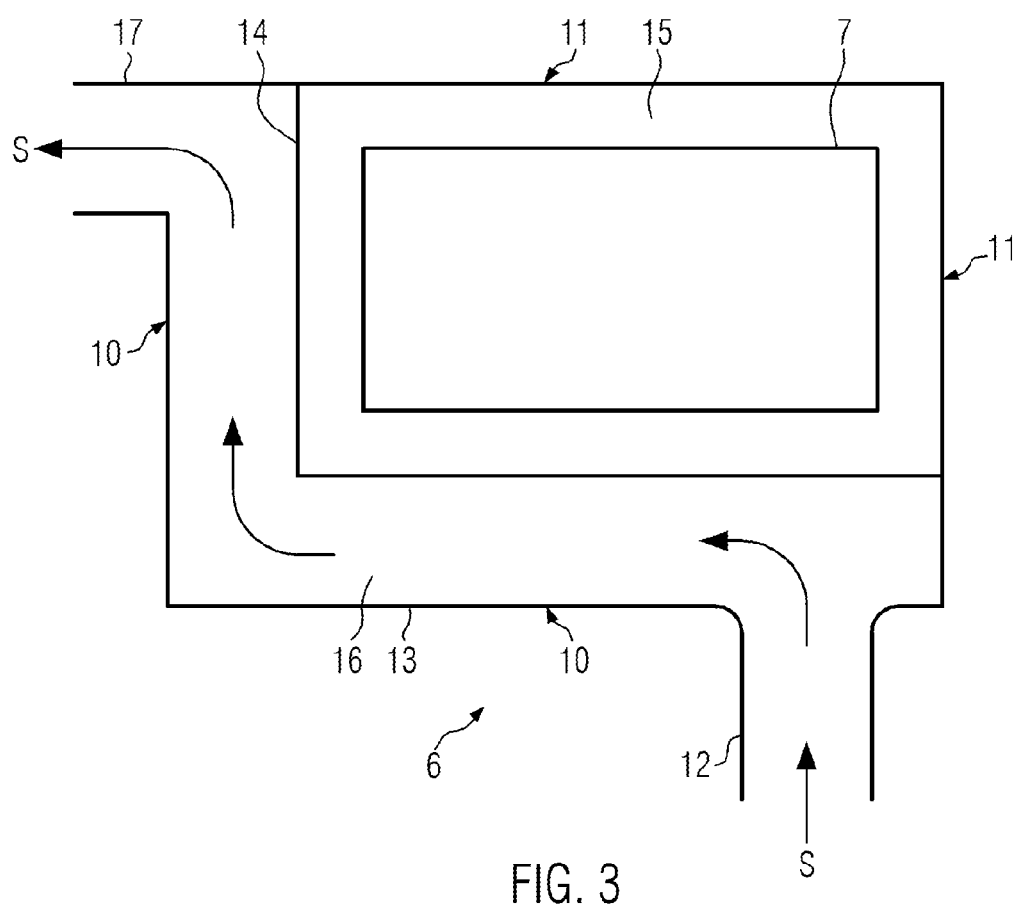
FIG. 3 shows a schematic sectional view of a housing for a machine component according to an embodiment of the present disclosure.

FIG. 3 is a sectional view of the housing 6 according to a first embodiment of the construction machine 1. The wall elements 10 facing the primary drive 2 are configured as double-walled elements, i.e., they comprise an outer wall 13 as well as an inner wall 14. The inner wall 14 defines an internal space 15 that accommodates the machine component 7. A flow passage 16 is defined by the inner wall 14 and the outer wall 13. In the present embodiment, the wall elements 11 facing away from the primary drive are configured such that they comprise only one wall.

Through the air inlet 12, ambient air is sucked-in in an air current S. The air current S flows through the flow passage 16, past the inner wall 14, where it takes up heat, and leaves the flow passage 16 through the air outlet 17. In this embodiment, the air inlet 12 and the air outlet 17 are arranged on the outer wall 13 at the maximum possible distance from one another. This ensures that the air current S will flow across the largest possible area of the inner wall 14.

Figure 4:
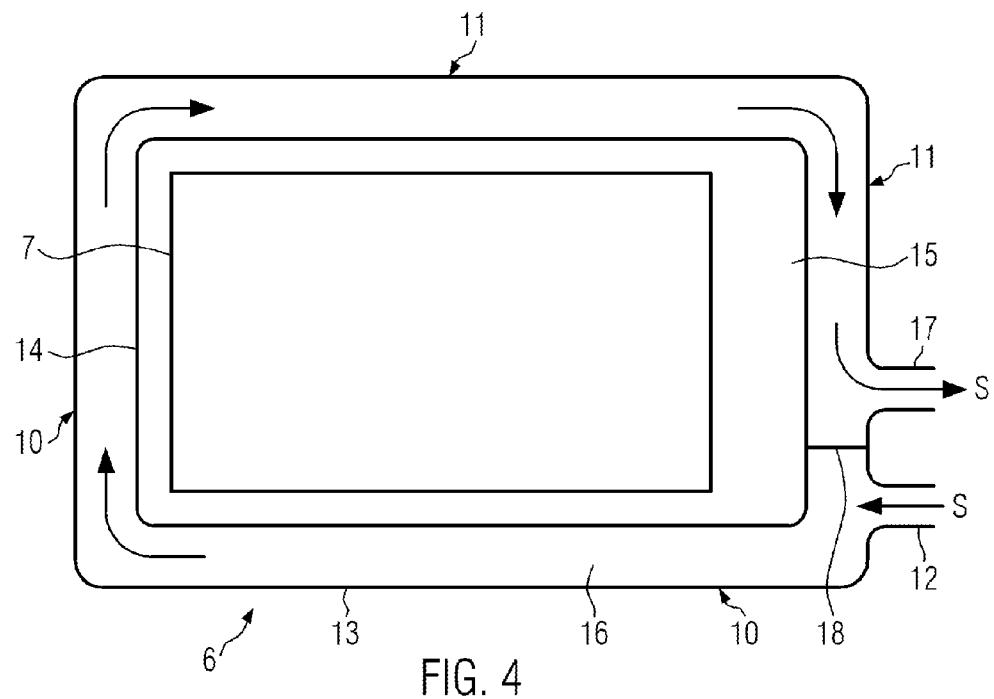
FIG. 4 shows a schematic sectional view of a housing for accommodating a machine component according to a further embodiment of the present disclosure.

FIG. 4 shows the housing 6 according to a further embodiment of the present disclosure. The air inlet 12 and the air outlet 17 are here arranged directly adjacent to one another. A dividing wall 18 ensures that the air current S will not take the shortest route from the air inlet 12 to the air outlet 17, but will flow through the entire flow passage 16 and, in so doing, take up the maximum possible amount of heat from the inner wall 14, and leave the flow passage 16 then through the air outlet 17. In addition, all wall elements 10, 11 are configured as double-walled elements in this embodiment.

Figure 5:
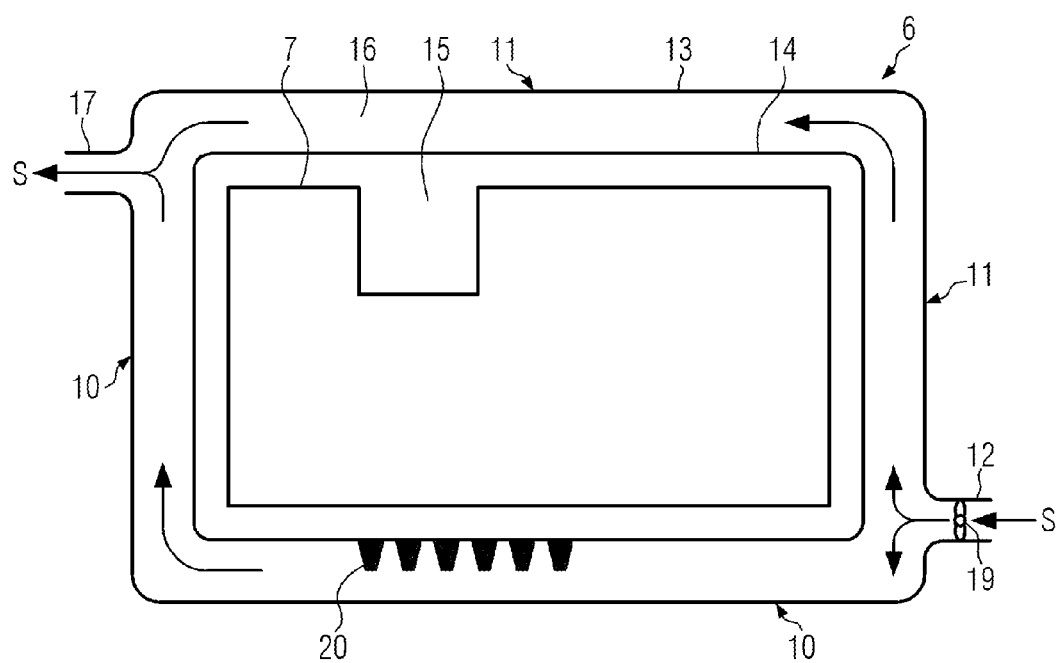
FIG. 5 shows a schematic sectional view of a housing for a machine component according to a further embodiment of the present disclosure.

In the embodiment shown in FIG. 5, all wall elements 10, 11 are configured as double-walled elements as well. A dividing wall 18 is not provided here. Instead, the air inlet 12 and the air outlet 17 are arranged on opposite sides of the housing 6 and/or the flow passage 16, respectively. Thus, it is again ensured that the air current S will flow across the largest possible area of the inner wall 14. In this embodiment, a fan 19 is provided for generating the pressure difference required for the air current S. A fan 19 may be used in all the embodiments.

According to a further variant, the air current S may be variably adjustable. This can be done manually or automatically. In the event that the pressure difference required for the air current S is generated by a fan 19, the adjustment of the air current can be accomplished by adapting the rotational speed of the fan 19. Alternatively, controllable valves may be used. The latter would be the preferred variant for enabling adjustability, when the underpressure required for the air current S is exclusively generated by the cooling device 5 of the primary drive 2. Just as the fan, such control valves may be provided at an arbitrary location at which the air current S flows through, e.g., the flow passage 16, the air inlet 12, the air outlet 17, the duct element 9 or a further duct element that may possibly be connected to the air inlet 12. The control of the fan speed or of the valve opening times (duty cycle) may be automatically controllable according to a further variant. Input parameters may here be the temperature of the machine component 7, the temperature of the primary drive 2 or both said values.

A further modification may be so conceived that cooling fins 20 extend from the inner wall 14 into the flow passage 16. This would improve heat dissipation from the internal space 15 on the one hand and the air current S could be influenced in a targeted way by such cooling fins on the other.

Figure 6:
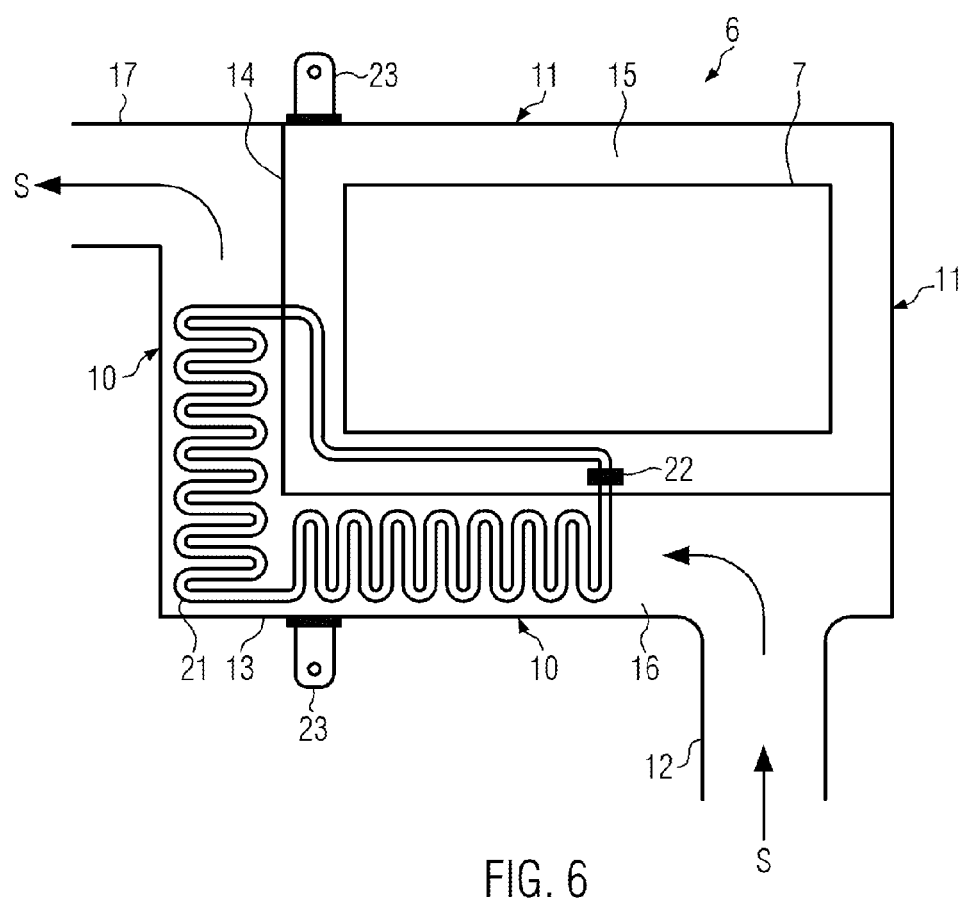
FIG. 6 shows a schematic sectional view of a housing for a machine component according to a further embodiment of the present disclosure.

According to a further variant, a heat exchanger 21 can be provided in the flow passage 16, as can be seen from FIG. 6, the heat exchanger 21 transporting with the aid of a medium heat from the internal space 15 into the flow passage 16. Such a variant may also include a heat pump 22 for machine components 7 requiring particularly intensive cooling.

According to a further modification, the flow passage 16 may be shaped such that a turbulent or a laminar air current S is formed. In this way, the transport of heat as well as other factors, such as noise development or the pressure in the flow passage 16, could be influenced.

A further variant is so conceived that the thermal conductivity of the inner wall 14 can be higher than the thermal conductivity of the outer wall 13. This would ensure that the smallest possible amount of heat is transferred from the primary drive into the flow passage 16, whereas the highest possible amount of heat is dissipated from the internal space 15 of the housing into the flow passage 16. For example, different materials having different thermal conductivities may be provided for the respective inner and outer walls. In addition, different wall thicknesses, various kinds of thermal insulation, multilayered walls or the like are conceivable.

Furthermore, the housing 6 may, according to a further variant, be thermally decoupled at fastening units 23 by which the housing 6 is fastened to or in the construction machine 1, as can be seen from FIG. 6. Undesired thermal bridges would be avoided in this way.

The embodiments described show the flow passage 16 as a double wall. It may, however, also extend in an arbitrary way or form through or in the internal space 15 of the housing 6. For example, a flow path having the greatest possible length and reaching the highest possible number of areas of the internal space may be provided. In addition, a helical or wavelike shape of the flow passage 16 is conceivable. The flow passage 16 may additionally have openings at various points, the openings allowing the cooling ambient air to flow directly across the machine component 7 or parts thereof.

The flow passage 16 may have any suitable cross-section, it may e.g., be circular, elliptical, square or rectangular.

According to a preferred variant, the construction machine 1 may be a road finisher or feeder.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A construction machine comprising:
   a primary drive configured to generate waste heat;
   a cooling device for the primary drive;
   one or a plurality of machine components arranged in an area of the primary drive; and
   a housing that accommodates at least one of the machine components, the housing including a flow passage through which ambient air can be sucked using underpressure or which can have ambient air supplied thereto using overpressure so that an air current can be created, wherein the housing comprises a wall element configured as a double-walled element that includes an inner wall and an outer wall, the inner wall and the outer wall defining the flow passage, and wherein the inner wall defines an internal space that accommodates the at least one of the machine components;
   wherein the cooling device is configured to at least partly generate the overpressure or the underpressure to create the air current, the air current being variably and automatically adjustable;
   wherein the construction machine is a road finisher or a feeder; and
   wherein the housing comprises multiple wall elements, and only the wall elements facing the primary drive are configured as double-walled elements, or all the wall elements of the housing are configured as double-walled elements.

2. The construction machine according to claim 1 further comprising a fan for partly generating the underpressure or the overpressure that creates the air current.

3. The construction machine according to claim 1 wherein the air current is controllable depending on temperature of the respective machine component and/or depending on temperature of the primary drive.

4. The construction machine according to claim 1 wherein the housing includes cooling fins that extend into the flow passage.

5. The construction machine according to claim 1 further comprising a heat exchanger arranged in the flow passage for conducting heat from the internal space of the housing.

6. The construction machine according to claim 1 wherein the flow passage is shaped such that when air flows therethrough a turbulent or a laminar air current will be created.

7. The construction machine according to claim 1 further comprising an air inlet and an air outlet are arranged on opposite sides of the flow passage.

8. The construction machine according to claim 1 wherein thermal conductivity of the inner wall is higher than thermal conductivity of the outer wall.

9. The construction machine according to claim 1 wherein only the wall elements of the housing facing the primary drive are configured as double-walled elements.

10. The construction machine according to claim 1 wherein all the wall elements of the housing are configured as double-walled elements.

11. The construction machine according to claim 1 wherein the housing is thermally decoupled at fastening units.

12. The construction machine of claim 1 further comprising a first duct that connects the cooling device to the primary drive, and a second duct that connects the cooling device to the housing.

13. A construction machine comprising:
- a primary drive configured to generate waste heat;
- a machine component arranged in an area in which the machine component is able to be influenced by the waste heat from the primary drive;
- a housing that receives the machine component, the housing including a flow passage through which ambient air can be sucked using underpressure or which can have ambient air supplied thereto using overpressure so that an air current can be created for dissipating heat from an internal space of the housing, wherein the housing comprises a wall element configured as a double-walled element that includes an inner wall and an outer wall, the inner wall and the outer wall at least partially define the flow passage, the inner wall at least partially defines the internal space of the housing, and the internal space accommodates the machine component; and
- a cooling device for the primary drive, wherein the cooling device is configured to at least partly generate the overpressure or the underpressure for creating the air current;
- wherein the housing comprises multiple wall elements, and only the wall elements facing the primary drive are configured as double-walled elements, or all the wall elements of the housing are configured as double-walled elements.

14. The construction machine of claim 13 further comprising a duct that connects the cooling device to the housing.

15. The construction machine of claim 14 further comprising an additional duct that connects the cooling device to the primary drive.

16. The construction machine of claim 14 wherein the air current is variably and automatically adjustable.

17. The construction machine of claim 16 wherein the primary drive is disposed outside of the housing.

18. The construction machine of claim 13 wherein only the wall elements of the housing facing the primary drive are configured as double-walled elements.

19. The construction machine of claim 17 wherein the construction machine is a road finisher or a feeder.

20. The construction machine of claim 13 wherein all the wall elements of the housing are configured as double-walled elements.

* * * * *